United States Patent [19]

Zwack et al.

[11] 4,153,545

[45] * May 8, 1979

[54] METHOD FOR CLEANING MEMBRANE FILTER

[75] Inventors: Robert R. Zwack, New Kensington; Roger M. Christenson, Gibsonia, both of Pa.

[73] Assignee: PPG Industries, Inc., Pittsburgh, Pa.

[ * ] Notice: The portion of the term of this patent subsequent to Jan. 23, 1996, has been disclaimed.

[21] Appl. No.: 825,734

[22] Filed: Aug. 18, 1977

[51] Int. Cl.² .............................................. B01D 13/00
[52] U.S. Cl. ..................................... 210/23 F; 210/81
[58] Field of Search ............... 204/181 C; 210/321 R, 210/22, 23 F, 23 H, 79, 81

[56] References Cited

U.S. PATENT DOCUMENTS

| 3,589,998 | 6/1971 | Rice et al. | 210/321 R X |
| 3,700,591 | 10/1972 | Higley | 210/321 R X |
| 3,827,976 | 8/1974 | Stana et al. | 210/321 R X |

Primary Examiner—Frank A. Spear, Jr.
Attorney, Agent, or Firm—William J. Uhl

[57] ABSTRACT

A method of cleaning a membrane such as an ultrafilter which has been used in the treatment of a cataphoretic paint is disclosed. The method involves treating the membrane with an aqueous solution of an acid, a fatty amine and a water-soluble organic solvent.

10 Claims, No Drawings

METHOD FOR CLEANING MEMBRANE FILTER

BACKGROUND OF THE INVENTION

1. Field of the Invention:

This invention is in the field of membrane separations of electrophoretic paints and particularly relates to the cleaning of a membrane which has been fouled by a cataphoretic paint.

2. Brief Description of the Prior Art:

Cationic electrodeposition of resinous materials onto metallic articles has become of great commercial significance in the appliance and automotive industries. Cationic electrodeposition provides coatings with outstanding corrosion resistance, usually much better than that provided by anionic electrodeposition. In anionic electrodeposition, the acidic resin is electrodeposited on a metallic article serving as the anode and any residual acidity in the resin reduces its corrosion resistance. Further, metal ions from the anode are trapped within the film and they also adversely affect the corrosion resistance and the color of the resultant coating. Cationic electrodeposition avoids these problems because the depositing resin is basic and there is no metal ion dissolution at the cathode.

A major problem in practicing electrodeposition on a continuous basis is in removing impurities and maintaining the electrodeposition bath properties. The solubilized electrodepositable resin is a polyelectrolyte and when the vehicle resin is coated upon the electrode, there remains in solution a counter ion which is used to solubilize the resin. In addition, as the electrodeposition proceeds, chemicals from various sources tend to accumulate in the electrodeposition bath. Contaminants such as phosphates and chromates are carried into the bath with the articles to be coated, and the paint itself can also introduce contaminants.

Ultrafiltration has been found to be a particularly effective means of removing impurities and maintaining the properties of the electrodeposition bath. Ultrafiltration removes from the bath low molecular weight impurities such as counter ion, phosphates, chromates and low molecular weight resinous fragments while retaining the desirable high molecular weight resinous materials and pigments. Besides helping to maintain the properties of the electrodeposition bath, ultrafiltration is also a means of generating rinse water for removing dragout from the freshly electrocoated articles.

With anionic electrodeposition paints, ultrafiltration can be operated continuously for many months at a time without the membrane fouling or becoming clogged. However, it has been found that with cationic electrodeposition paints, fouling and clogging of the membrane is a much more serious problem. Although the cause of the problem is not completely understood, it is believed that many of the commercially available ultrafiltration membranes are made from materials which are more compatible with anionically charged resinous vehicles. Thus, many of the synthetic polymeric materials used in making the membranes such as various cellulose esters, polyacrylic esters, acrylonitrile polymers and polysulfones contain negative polarities which may repel the negatively charged anionic electrodeposition resins. However, these membranes may attract the positively charged cationic electrodeposition resins and as a result cause fouling and plugging of the membrane. Whatever the reason, experience has shown that typical commercially available ultrafiltration membranes which are used on a continuous basis for the treatment of anionic paints foul and become plugged much more quickly when used with cationic paints. Membrane fouling is a serious problem in that it not only detrimentally affects the properties of the electrodeposition bath but also restricts the generation of needed rinse water.

SUMMARY OF THE INVENTION

In accordance with the present invention, it has been found that membranes which have been fouled in treating a cataphoretic paint, such as by ultrafiltration, can be cleaned by treating the membrane with an aqueous solution of an acid, a fatty amine and a water-soluble organic solvent.

DETAILED DESCRIPTION

Typical cataphoretic paints which have been found to foul the membranes are those in which the resinous vehicle of the paint contains amine salt groups or quaternary ammonium salt groups. Resinous vehicles containing amine salt groups are described in U.S. Pat. Nos. 3,799,854; 3,984,299, both to Jerabek; and 3,947,338 to Jerabek, Marchetti and Zwack. Quaternary ammonium salt group-containing resins useful in electrodeposition paints are described in U.S. Pat. Nos. 3,962,165 and 3,937,679 to Bosso and Wismer. Besides the resinous vehicle, the cataphoretic paints also contain pigments, co-solvents, surfactants and optional ingredients such as plasticizers and stabilizers such as described in the aforementioned patents.

As mentioned above, the types of membranes which are fouled in the process of the invention are ultrafiltration membranes. The use of ultrafiltration for treating an electrodeposition bath is described in U.S. Pat. No. 3,663,405 to Christenson et al. Ultrafiltration involves forcing the paint under a pressure gradient against a suitable membrane. The membrane passes low molecular weight species such as water and organic co-solvents and low molecular weight impurities which accumulate in the bath, for example, metal pretreatment chemicals, such as chromates, phosphates and other ions such as chloride and sulfate and low molecular weight resinous fragments while retaining the higher molecular weight vehicle resins and pigments. Ultrafiltration operates at a pressure of about 10 to 150 psi and usually about 25 to 75 psi.

The basic ultrafiltration process is relatively simple. The paint to be ultrafiltered is confined under pressure, utilizing, for example, either a compressed gas or liquid pump in a cell, in contact with an appropriate ultrafiltration membrane suitable supported.

Ultrafiltration apparatus designed for treatment of electroposition paints are well known in the art and are described, for example, in U.S. Pat. Nos. 3,494,465 and 3,834,545.

Membranes for use in ultrafiltration are also well known and are supplied from a number of commercial manufacturers including Dorr-Oliver Company, Romicon Company, ABCOR Corporation and Union Carbide Corporation. Membranes can be typically prepared from organic resinous materials such as cellulose acetate, polyvinyl chloride, polyacrylonitrile, polysulfones, polycarbonates, polyesters such as poly(methyl methacrylate) and poly(n-butyl acrylate), as well as copolymers formed from monomeric units of the above polymers, e.g., acrylonitrile-vinyl chloride copolymers.

Membranes can also be prepared from inorganic materials.

It should be pointed out, however, that not all membrane materials may have sufficient solvent resistance to withstand the cleaning treatment of the present invention. Therefore, it is suggested that before the membrane is cleaned, a trial be undertaken to determine whether or not the membrane material can withstand the cleaning solution.

Besides ultrafiltration membranes, membranes which are used in other pressure filtration operations, such as reverse osmosis membranes, should also be cleanable in accordance with the present invention.

The treating solution which is used in cleaning the membranes is an aqueous solution of an acid, a fatty amine, a water-soluble organic solvent and preferably an acetylenic polyol.

Suitable fatty amines are primary, secondary and tertiary amines containing at least one fatty moiety in the amine molecule. The fatty moiety is defined as an acyclic hydrocarbon radical containing from 8 to 24 carbon atoms. The acyclic hydrocarbon radical includes saturated straight chain and branched chain species as well as ethylenically unsaturated species. Examples include octyl, 2-ethylhexyl, lauryl, palmyl, stearyl, coco and oleyl. Particularly preferred fatty amines are substituted imidazolines which are represented by the following structural formula:

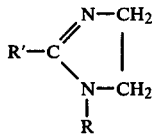

where R is a relatively low molecular weight substituent such as hydrogen or an alkyl group having 1 to 4 carbon atoms such as methyl, ethyl, propyl and butyl and R' is a fatty moiety, that is, an acyclic hydrocarbon radical as described above with coco being preferred.

Examples of other fatty amines which should be suitable in the practice of the invention are primary fatty amines such as cocoamine, N-hexadecylamine, N-octadecylamine, hydrogenated tallow-amine and tallow amine. In addition to the primary fatty amines mentioned above, secondary and tertiary amines such as N-methyl-cocoamine and N,N'-dimethyl cocoamine should also be suitable.

Fatty diamines should also be suitable in the practice of the invention and are to be included within the definition of fatty amines. The fatty diamines may be prepared by reacting fatty amines such as those mentioned above with acrylonitrile to give the corresponding cyanoethyl amine which on hydrogenation gives the fatty diamine containing both primary and secondary amine groups.

The cleaning solution also contains an acid, a portion of which reacts with the fatty amine to give an amine salt. Amine salts are water soluble and possess soap-like properties with good wetting and dispersing agent action at neutral and acid pH's. Examples of suitable acids are organic acids such as formic acid, lactic acid and acetic and mixtures thereof.

A water-soluble organic solvent is also included in the cleaning solution. Preferably the organic solvent is miscible with water although less solubility can be tolerated. Examples of organic solvents include monoalkyl ethers of ethylene glycols in which the alkyl group contains from about 1 to 6 atoms. Examples include the monoethyl, monobutyl and monohexyl ethers of ethylene glycol. These products are commercially available from Union Carbide Corporation under the trademark CELLOSOLVE ®. Also suitable would be the alkyl ethers of diethylene glycol such as butyl, ethyl and hexyl ethers of diethylene glycol. These materials are also commercially available from Union Carbide Corporation under the trademark CARBITOL ®. Examples of other water-soluble organic solvents are alcohols such as isopropanol and ketones such as acetone, methyl ethyl ketone, 4-methoxy-4-methyl-pentanone-2 and esters such as 2-ethoxyethyl acetate. Also, mixtures of water-soluble organic solvents can also be used.

Preferably, the cleaning solution also contains a non ionic surfactant most preferably an acetylenic polyol such as those having the following structural formula:

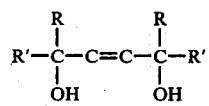

where the R groups can be the same or different and are selected from hydrogen and lower alkyl containing 1 to 4 carbon atoms such as methyl and ethyl, and the R' groups can be the same or different and are selected from hydrogen and alkyl radicals, preferably branched alkyl radicals containing from about 3 to 10 carbon stoms. Examples of suitable acetylenic polyols are 4,7-dimethyl-5-decyn-4,7-diol and 2,4,7,9- tetramethyl-5-decyn-4,7-diol which are commercially available from Air Products and Chemicals under the trademark SURFYNOL ®. Also, oxyalkylated adducts of the acetylenic polyols can be used such as the adduct of 2,4,7,9-tetramethyl-5-decyn-4,7-diol and ethylene oxide.

The proportions of the various ingredients which are used in the cleaning solution vary over the ranges of from about 0.25 to 10 preferably 0.25 to 5 percent by weight fatty amine, 1 to 20 preferably 1 to 10 percent by weight acid, 2 to 40 preferably 2 to 25 percent by weight water-soluble organic solvent and from about 0 to 10 and preferably 0.25 to 5 percent by weight of acetylenic polyol and the balance, that is from about 40 to 96.75 preferably from 60 to 96.75 percent by weight water; the percentages by weight being based on total weight of fatty amine, acid, water-soluble organic solvent, acetylenic polyol (if used) and water.

Besides the key ingredients mentioned above, other ingredients such as other surfactants, dispersing agents, acids and solvents other than those mentioned above can optionally be included in the cleaning solution. Other optional ingredients such as defoaming agents, bactericides and corrosion inhibitors can also be included. These optional ingredients can be present in the cleaning solution in amounts of up to 10 percent by weight based on total weight of the cleaning solution.

The cleaning solution is preferably prepared by adding the fatty amine and acetylenic polyol if used to the water-miscible solvent followed by the addition of the acid and water. The order of addition does not appear critical although the fatty amine should be acidified before combining with water. Although not essential, mild stirring or agitation is preferably used throughout the addition.

In treating the membranes with the cleaning solution, the device, such as an ultrafilter, in which the membranes are housed, is isolated from the source of paint, drained of paint, and water circulated through the filtering device and across the membrane surface to remove residual paint. The water is then drained from the filtering device and the cleaning solution introduced and circulated across the membrane surface. In the case of an ultrafilter, the cleaning solution is pumped across the face of the fouled membrane under pressure, usually conventional ultrafiltration pressures which are used with cationic electrodeposition paints, that is, from about 10 to 150 psi. The temperature of the cleaning solution is not particularly critical and the temperature can range from room temperature, that is, about 20° C., to higher temperature depending on thermal resistance of the membrane, with temperatures on the order of 35 to 80° C. being preferred.

The cleaning solution is recirculated across the membrane surface for a period of time sufficient to clean and unclog the membrane. The period of time that the cleaning solution is passed across the membrane depends on the nature and the degree of fouling. In general, for commercial ultrafiltration devices, the cleaning solution should be circulated for at least about one hour and preferably for at least two hours. A combination of recirculating the cleaning solution across the membrane surface for at least one hour followed by soaking the membrane surface in the cleaning solution for at least about five hours is usually a very effective cleaning procedure.

The effectiveness of the cleaning can be determined visually since a fouled membrane will be discolored. Also, the flux rate of water or paint permeating through the membrane before and after cleaning can be compared. The flux rates are greater after cleaning than before. Usually the flux rates after cleaning are close to that of a new membrane and in some cases may even be greater.

Illustrating the invention are the following examples which are not to be construed as limiting the invention to their details. All parts and percentages in the examples as well as throughout the specification are by weight unless otherwise specified.

EXAMPLE I

A cleaning solution was prepared by adding the following ingredients together in the order used with mild stirring:

| Ingredient | Parts by Weight |
| --- | --- |
| surfactant blend[1] | 12.5 |
| butyl CELLOSOLVE[2] | 7.5 |
| lactic acid (88 percent by weight) in water) | 5.7 |
| deionized water | 74.3 |

[1]40 percent solids solution comprising 50 percent by weight cocoimidazoline commercially available from Geigy Industrial Chemicals as GEIGY AMINE C and 50 percent by weight of 2,4,7,9-tetramethyl-5-decyn-4,7-diol commercially available from Air Products and Chemicals Inc. as SURFYNOL 104. Solvent comprises 60 percent by weight of the solution and contains 5.28 percent by weight acetic acid, 33.33 percent by weight butyl CELLOSOLVE and 61.39 percent by weight deionized water.
[2]Monobutyl ether of ethylene glycol.

The cleaning solution was used to clean a clogged ultrafiltration membrane which had been fouled with a cationic electrodeposition paint such as the type generally described in U.S. Pat. No. 3,947,339. The paint contained a tertiary amine salt resinous vehicle and was pigmented with carbon black, lead silicate, strontium chromate and clay. The membrane was in tubular form (about 1 inch in diameter) supported on porous tubular supports which were contained in a multi-tubular modular housing.

The ultrafilter was isolated from the source of paint and drained. Water was recirculated through the ultrafilter and across the membrane surface until the water passing through the ultrafilter appeared clear. The flux was 82 gal./ft.$^2$/day at 80° F. (27° C.), 50 psi. The cleaning solution at a temperature of 80° F. (27° C.) was then introduced into the ultrafilter and circulated across the membrane surface at 11 psi. After circulating for 12 hours, the cleaning solution was drained from the ultrafilter and the membranes examined. They looked considerably cleaner. When water was recirculated through the cleaned ultrafilter, its flux rate was 164 gal./ft.$^2$/day at 80° F. (27° C.) and 50 psi, an increase of 100 percent. In addition, the cationic electrodeposition paint was circulated through the ultrafilter and the flux rate of the permeate permeating through the ultrafiltration membranes was about 40 percent greater than that immediately before cleaning, improving from 11.7 to 16.4 gal./ft.$^2$/day.

EXAMPLE II

A cleaning solution prepared as described in Example I was used to clean a clogged ultrafiltration membrane fouled with a paint similar to Example I in a similar ultrafiltration tube housing.

The ultrafilter was isolated from the source of paint and drained. Water was recirculated through the ultrafilter and across the membrane surface at 14 gallons per minute until the water passing through the ultrafilter was clear. The cleaning solution at a temperature of 80° F. (27° C.) was then introduced into the ultrafilter and circulated across the membrane surface at 14 gallons per minute per tube for one hour. The tubes were then sealed up and allowed to soak with cleaning solution for 24 hours. Upon draining the cleaning solution, visual inspection of the cleaned tubes indicated a cleaner surface. When deionized water was circulated through the cleaned ultrafilter, its flux rate was 300 gal./ft.$^2$/day at 50 psi and 80° F. (27° C.), a rate representative of fresh unused tubes. In addition, the cationic paint was circulated through the ultrafilter, and the permeate through the ultrafilter was about 123 percent greater than that immediately before cleaning, improving from 7.0 to 15.6 gal./ft.$^2$/day.

EXAMPLE III

A cleaning solution similar to that of Example I was prepared from the following ingredients:

| Ingredient | Parts by Weight |
| --- | --- |
| surfactant blend of Example I | 103.7 |
| butyl CELLOSOLVE | 62.2 |
| ethyl CELLOSOLVE[1] | 87.7 |
| lactic acid (88 percent by weight in water) | 47.1 |
| deionized water | 829.7 |

[1]Monoethyl ether of ethylene glycol.

The cleaning solution was used to clean a clogged ultrafilter membrane which had been fouled with a cationic electrodeposition paint such as described in U.S. Pat. No. 3,937,679. The paint contained a quaternary ammonium salt group-containing resinous vehicle and was pigmented with titanium dioxide, aluminum silicate, red iron oxide, yellow iron oxide, and carbon black. The membrane was in tubular form as generally described in connection with Example I. The ultrafilter was first drained of paint and water circulated through the membrane as described in Example I. The cleaning solution was then circulated through the ultrafilter at a temperature of 120° F. (49° C.) at about 30 psi. A sponge ball having approximately the same diameter as the ultrafiltration tubes was circulated along with the cleaning solution to provide a mild abrasive action to scrape contaminant from the surface of the membrane. After circulating the cleaning solution through the membrane for about 18 hours, the membranes looked considerably cleaner. In addition, the flux rate of water permeating through the membrane was 300 percent greater than immediately before cleaning.

We claim:

1. A method of cleaning a membrane which has been used for filtering under pressure a cataphoretic paint and which has been fouled by said paint, said method comprising:
    (A) contacting said membrane with an aqueous solution of an acid, a fatty amine and a water-soluble organic solvent for a period of time sufficient to clean said membrane.

2. The method of claim 1 in which the filtering is an ultrafiltration.

3. The method of claim 1 in which the acid is an organic acid.

4. The method of claim 3 in which the organic acid is selected from the class consisting of formic acid, acetic acid and lactic acid.

5. The method of claim 1 in which the water-soluble solvent is a monoalkyl ether of ethylene glycol.

6. The method of claim 1 in which the fatty amine is cocoimidazoline.

7. The method of claim 1 in which the solution additionally contains an acetylenic polyol.

8. The method of claim 7 in which the acetylenic polyol is 2,4,7,9-tetramethyl-5-decyn-4,7-diol.

9. The method of claim 1 in which the cleaning solution is circulated across the face of the fouled membrane under pressure.

10. A method of cleaning a membrane which has been used for ultrafiltering cataphoretic paint and which has been fouled by said paint, said method comprising:
    (A) contacting said membrane with an aqueous solution of an acid, a water-soluble organic solvent, a fatty amine and an acetylenic polyol for a period of time sufficient to clean said membrane.

* * * * *

UNITED STATES PATENT AND TRADEMARK OFFICE
CERTIFICATE OF CORRECTION

PATENT NO. : 4,153,545

DATED : May 8, 1979

INVENTOR(S) : Robert R. Zwack and Roger M. Christenson

It is certified that error appears in the above-identified patent and that said Letters Patent are hereby corrected as shown below:

Column 2, line 53, "suitable" should be --suitably--.

Column 3, line 63, insert --acid-- after "acetic".

Column 4, line 1, insert --carbon-- before "atoms".

Column 4, line 30, "stoms" should be --atoms--.

Column 5, line 52, delete the parenthesis after "weight".

Signed and Sealed this

Twenty-eighth Day of August 1979

[SEAL]

Attest:

LUTRELLE F. PARKER

Attesting Officer

Acting Commissioner of Patents and Trademarks